United States Patent [19]

Csoppenszky et al.

[11] Patent Number: 5,852,608
[45] Date of Patent: Dec. 22, 1998

[54] STRUCTURE AND METHOD FOR BI-DIRECTIONAL DATA TRANSFER BETWEEN ASYNCHRONOUS CLOCK DOMAINS

[75] Inventors: Michael A. Csoppenszky, Los Gatos; Kevin B. Normoyle, Santa Clara, both of Calif.

[73] Assignee: Sun Microsystems, Inc., Mountain View, Calif.

[21] Appl. No.: 659,729

[22] Filed: Jun. 6, 1996

[51] Int. Cl.⁶ .................................................. G06F 12/00
[52] U.S. Cl. ..................... 370/465; 711/149; 365/230.05
[58] Field of Search ................................... 370/465, 276, 370/282, 412, 503; 395/476, 477, 495, 458; 364/242.6, 244.8, 259.2, 965.9, 969.4; 365/230.05, 230.03, 230.04, 195, 189.04; 711/149, 147, 150, 144, 168

[56] References Cited

U.S. PATENT DOCUMENTS

| | | | |
|---|---|---|---|
| 5,276,842 | 1/1994 | Sugita | 395/476 |
| 5,388,237 | 2/1995 | Sodos | 395/842 |
| 5,459,851 | 10/1995 | Nakajima et al. | 395/476 |
| 5,659,711 | 8/1997 | Sugita | 395/476 |

*Primary Examiner*—Chau Nguyen
*Attorney, Agent, or Firm*—Skjerven, Morrill, MacPherson, Franklin & Friel; David T. Millers

[57] ABSTRACT

Bi-directional data transfers between a first system and a second system, which have asynchronous clock domains, are performed using a single dual-port memory. A direction control circuit, which is connected between the first and second systems, determines the desired direction of data transfer and generates one or more direction signals representative of this direction. A write control circuit is coupled to receive a direction control signal, as well as write control signals from the first and second systems. Similarly, a read control signal is coupled to receive a direction control signal, as well as read control signals from the first and second systems. If data transfer is to proceed from the first system to the second system, the write control circuit gives the first system control over the write port of the dual-port memory, and the read control circuit gives the second system control over the read port of the dual-port memory in response to the direction control signals. Conversely, if data transfer is to proceed from the second system to the first system, the write control circuit gives the second system control over the write port of the dual-port memory, and the read control circuit gives the first system control over the read port of the dual-port memory in response to the direction control signals.

12 Claims, 2 Drawing Sheets

STRUCTURE AND METHOD FOR BI-DIRECTIONAL DATA TRANSFER BETWEEN ASYNCHRONOUS CLOCK DOMAINS

CROSS REFERENCE TO RELATED APPLICATION

This application is related to commonly owned, co-pending U.S. patent application Ser. No. 08/660/026, filed Jun. 6,1996, entitled "LOW-LATENCY, HIGH-THROUGHPUT, INTEGRATED CACHE COHERENT I/O SYSTEM FOR A SINGLE-CHIP PROCESSOR by Kevin B. Normoyle, Michael A. Csoppenszky, Jaybharat Boddu, Jui-Cheng Su, Alex S. Han, Rajasekhar Cherabuddi, Tzungren Tzeng, which is hereby incorporated by reference in its entirety.

FIELD OF THE INVENTION

The present invention relates to a structure and method of transferring data in a bi-directional manner between systems having asynchronous clock domains.

BACKGROUND OF THE INVENTION

FIG. 1 is a block diagram of a conventional bi-directional dual-port memory system 100 which includes two separate first in, first out (FIFO) memories 103 and 104 connected between two separate systems 101 and 102. FIFO memory 103 facilitates data transfer from system 101 to system 102. FIFO memory 104 facilitates data transfer from system 102 to system 101. Thus, each of FIFO memories 103 and 104 facilitates a different direction of data transfer between systems 101 and 102.

System 101 operates in response to a first clock (CLK1) signal, and system 102 operates in response to a second clock (CLK2) signal. The CLK1 and CLK2 signals are asynchronous. That is, the CLK1 and CLK2 signals have different frequencies and/or phases with respect to one another. The CLK1 signal is used to clock data values DATA_OUT_1 from system 101 into FIFO memory 103. The CLK1 signal is also used to clock data values DATA_IN_1 from FIFO memory 104 into system 101. Similarly, the CLK2 signal is used to clock data values DATA_OUT_2 from system 102 into FIFO memory 104. The CLK2 signal is also used to clock data values DATA_IN_2 from FIFO memory 103 into system 102.

Because a separate FIFO memory 103 or 104 is dedicated to provide for data transfer in each direction between systems 101 and 102, data transfer can take place simultaneously in both directions between systems 101 and 102. However, the use of two separate FIFO memories 103 and 104 is relatively expensive in terms of the silicon layout area required to fabricate memory system 100.

It would therefore be desirable to have a method and structure for operably coupling two systems having asynchronous clock domains in an area efficient manner. It would also be desirable if this method and structure operates with a bi-directional manner with low standby power and a high data rate.

SUMMARY

Accordingly, the present invention provides an electronic system which includes a first system which operates in response to a first clock signal and a second system which operates in response to a second clock signal, the first clock signal being asynchronous with respect to the second clock signal. A direction control circuit is connected between the first and second systems. The direction control circuit determines whether data transfer between the first and second systems is to occur in a first direction from the first system to the second system, or in a second direction from the second system to the first system. The direction control circuit provides one or more direction control signals which are representative of the direction of data transfer. Data transfer proceeds through a single dual-port memory having a write port and a read port.

A write control circuit is coupled to the first system, the second system and the direction control circuit. The write control circuit receives at least one of the direction control signals from the direction control circuit. When the direction control signals are representative of the first direction of data transfer, the write control circuit couples the first system to the write port of the dual-port memory. Conversely, when the direction control signals are representative of the second direction of data transfer, the write control circuit couples the second system to the write port of the dual-port memory.

A read control circuit is coupled to the first system, the second system and the direction control circuit. The read control circuit receives at least one of the direction control signals from the direction control circuit. When the direction control signals are representative of the first direction of data transfer, the read control circuit couples the second system to the read port of the dual-port memory. Conversely, when the direction control signals are representative of the second direction of data transfer, the read control circuit couples the first system to the read port of the dual-port memory.

In the foregoing manner, bi-directional data transfer between the first and second systems is enabled using a single dual-port memory. Because only one dual-port memory is required, the layout area of the electronic system is advantageously reduced when compared with prior art systems.

The first and second systems can include various computer-based systems. In one embodiment, the first system includes a central processing unit (CPU). This CPU can be included in the same integrated circuit as the direction control circuit, the write control circuit, the read control circuit and the dual-port memory. The second system can be, for example, a PCI-based system. In such an embodiment, the integrated circuit which includes the CPU can be easily connected to various PCI-based systems.

The present invention further includes a method of providing bi-directional data transfer between a first system which operates in response to a first clock signal and a second system which operates in response to a second clock signal, wherein the first clock signal is asynchronous with respect to the second clock signal. This method includes the steps of: (1) determining a direction of data transfer between the first and second systems, the direction of data transfer being either a first direction from the first system to the second system, or a second direction from the second system to the first system, (2) generating one or more direction control signals representative of the direction of data transfer, (3) coupling the first system to a write port of a dual-port memory when the direction control signals are representative of the first direction of data transfer, (4) coupling the second system to a read port of the dual-port memory when the direction control signals are representative of the first direction of data transfer, (5) coupling the second system to the write port of the dual-port memory when the direction control signals are representative of the second direction of data transfer, and (6) coupling the first system to the read port of the dual-port memory when the direction control signals are representative of the second direction of data transfer.

The present invention will be more fully understood in light of the following detailed description taken together with the drawings.

DETAILED DESCRIPTION

Figure 1:
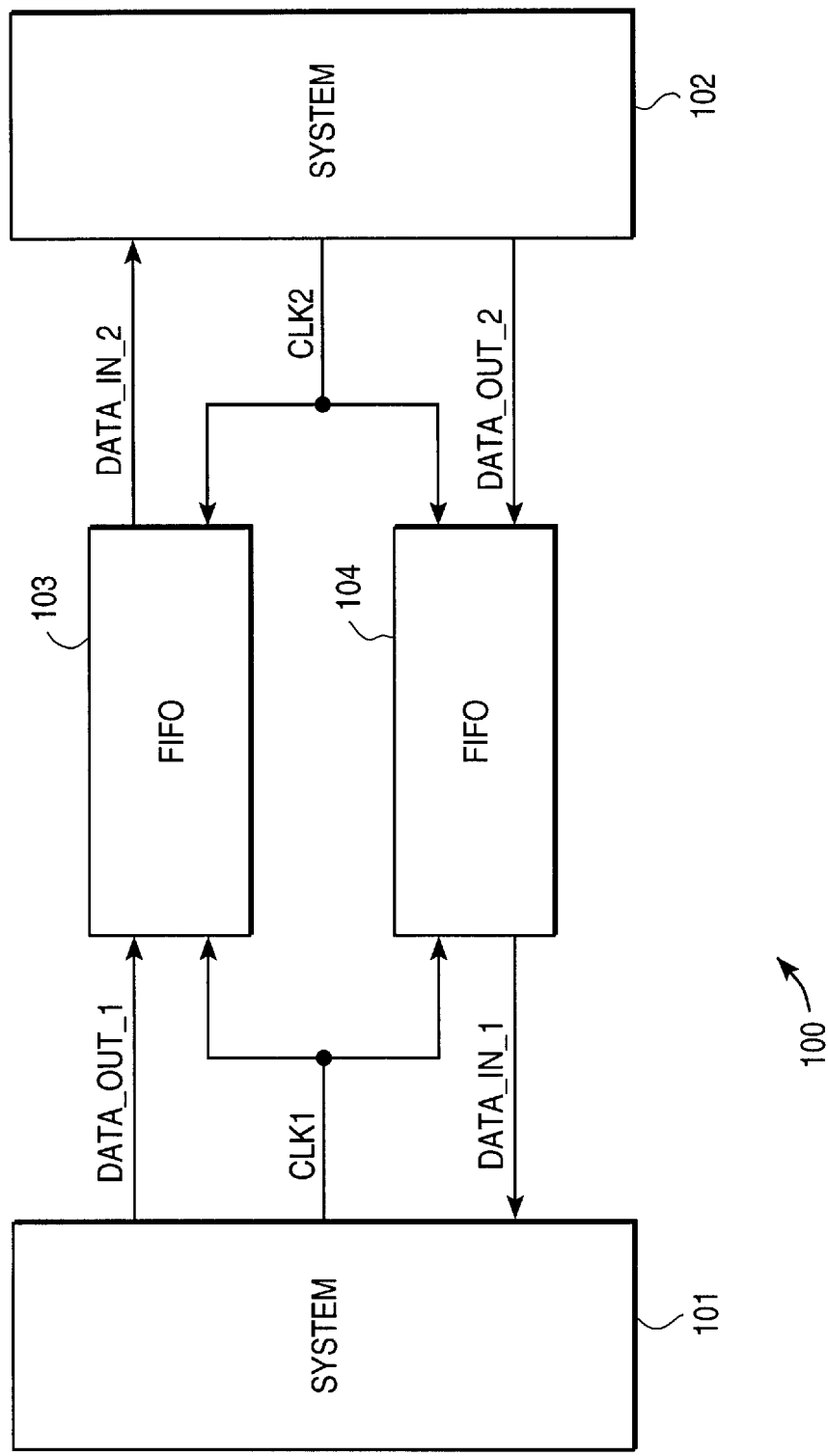
FIG. 1 is a block diagram of a conventional bi-directional dual-port memory system.
Figure 2:
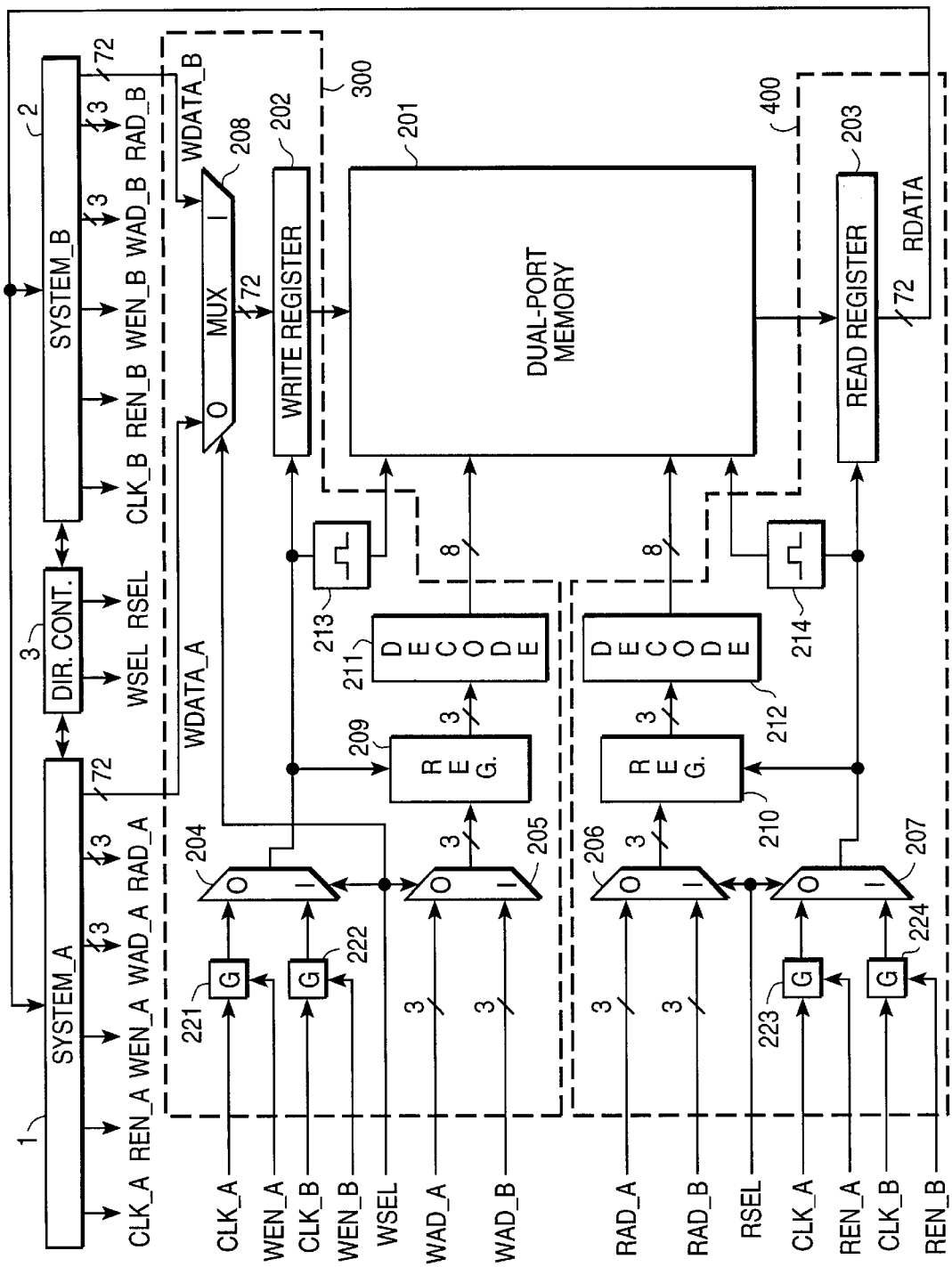
FIG. 2 is a block diagram of a bi-directional dual-port memory system in accordance with one embodiment of the invention.

FIG. 2 is a block diagram of an electronic system 200 in accordance with one embodiment of the invention. Electronic system 200 includes System_A 1, System_B 2, direction control circuit 3, dual-port random access memory (RAM) 201, write control circuit 300 and read control circuit 400. As described in more detail below, bi-directional data transfer between System_A 1 and System_B 2 proceeds through a single dual-port memory 201. Direction control circuit 3 generates direction control signals WSEL and RSEL, which configure write control circuit 300 and read control circuit 400 to transfer data from System_A 1 to System_B 2 through dual-port memory 201, or to transfer data from System_B 2 to System_A 1 through dual-port memory 201. By providing bi-directional data transfer using a single dual-port memory 201, the layout area of system 200 is reduced when compared with prior art system 100. In the embodiment described below, data can be transferred at relatively high rates of up to 200 Mhz or greater.

Write control circuit 300 includes write data register 202, multiplexers 204, 205 and 208, write address register 209, write address decoder 211, write pulse generator 213 and clock gating circuits 221 and 222. Read control circuit 400 includes read data register 203, multiplexers 206 and 207, read address register 210, read address decoders 212, read pulse generator 214, and clock gating circuits 223–224.

In the described embodiment, dual-port memory 201 is 72 bits wide and 8 bits deep. However, dual-port memory 201 can be modified to have other widths and depths in accordance with other embodiments of the invention. Dual-port memory 201 can be implemented using various memory cell technologies. For example, dual-port memory 201 can be a static random access memory (SRAM), a dynamic random access memory (DRAM), or a plurality of latches, as known to those of ordinary skill in the art. Although memory 201 is described as being a random access memory, it is understood that in other embodiments of the invention, memory 201 can be a first in, first out (FIFO) memory.

System_A 1 and System_B 2 operate in response to respective clock signals CLK_A and CLK_B, which are asynchronous with respect to each other. That is, the CLK_A and CLK_B signals have different frequencies and/or phases. Data can be transferred bi-directionally between System_A 1 and System_B 2. More specifically, data can be transferred from System_A 1 to System_B 2 through dual-port memory 201. Data can also be transferred from System_B 2 to System_A 1 through dual-port memory 201. However, data cannot be transferred in both directions simultaneously.

The direction of data transfer is detected and reported by direction control circuit 3. Direction control circuit 3 is connected between System_A 1 and System_B 2. Before initiating an inter-system data transfer, System_A 1 and System_B 2 communicate through direction control circuit 3. This communication includes a request and an acknowledgement.

In one embodiment, one of System_A 1 and System_B 2 is designated as a controlling system, and the other system is designated as a controlled system. The controlling system transmits all data transfer request signals, and the controlled system transmits all data transfer acknowledge signals. In the described example, System_B 2 is designated as the controlling system and System_A 1 is designated as the controlled system. To initiate a data transfer from System_A 1 to System_B 2, the controlling System_B 2 transmits a read request signal to direction control circuit 3. Direction control circuit 3 synchronizes the read request signal with the CLK_A signal, and transmits the read request signal to System_A 1. System_A 1 then acknowledges the read request signal by transmitting a read acknowledge signal to direction control circuit 3. Direction control circuit 3 synchronizes the read acknowledge signal with the CLK_B signal and transmits the read acknowledge signal to System_B 2.

Similarly, to initiate a data transfer from System_B 2 to System_A 1, the controlling System_B 2 transmits a write request signal to direction control circuit 3. Direction control circuit 3 synchronizes the write request signal with the CLK_A signal, and transmits the write request signal to System_A 1. System_A 1 then acknowledges the write request signal by transmitting a write acknowledge signal to direction control circuit 3. Direction control circuit 3 synchronizes the write acknowledge signal with the CLK_B signal and transmits the write acknowledge signal to System_B 2.

Direction control circuit 3 monitors the request signals received from controlling System_B 2, and determines the direction of data transfer by identifying whether the request signal is a read request signal or a write request signal. In a variation of the previously described embodiment, System_A 1 is the controlling system, and System_B 2 is the controlled system.

The above described embodiment can be modified such that both System_A 1 and System_B 2 are capable of being controlling systems. In one such modification, direction control circuit 3 is adapted to receive read and write request signals (and read and write acknowledge signals) from both System_A 1 and System_B 2. In this embodiment, either one of System_A 1 or System_B 2 can be the controlling system, depending upon which system is transmitting a request signal. Direction control circuit 3 synchronizes the request and acknowledge signals as previously described, and also performs an arbitration function in response to the request signals received from System_A 1 and System_B 2.

In another modification, direction control circuit 3, write control circuit 300, read control circuit 400, and dual-port memory 201 are duplicated. In this embodiment, the original direction control circuit is adapted to allow System_B 2 to be the controlling system and System_A 1 to be the controlled system. Conversely, the duplicate direction control circuit is adapted to allow System_A 1 to be the controlling system and System_B 2 to be the controlled system.

Direction control circuit 3 generates a write select (WSEL) signal and a read select (RSEL) signal in response to the determined direction of data transfer. The WSEL and RSEL signals are representative of the direction of data transfer. The WSEL signal is provided to write control circuit 300, and the RSEL signal is provided to read control circuit 400. As described in more detail below, the state of the WSEL signal determines which system (System_A 1 or System_B 2) has control of the write port of dual-port memory 201. In a similar manner, the state of the RSEL signal determines which system (System_A 1 or System_B 2) has control of the read port of dual-port memory 201. Although the WSEL and RSEL are illustrated and described as separate signals, it is understood that a single signal could alternatively be used to indicate the direction of data transfer.

Once a direction of data transfer has been established, this direction remains selected until the controlling system requests a data transfer in the opposite direction (via direction control circuit 3).

System_A 1 and System_B 2 each provide a plurality of write control signals to write control circuit 300. More specifically, System_A 1 provides a 72-bit write data (WDATA_A) signal to multiplexer 208, a write enable (WEN_A) signal and the CLK_A signal to clock gating circuit 221, and a 3bit write address (WAD_A) signal to multiplexer 205. System_B 2 provides a 72-bit write data (WDATA_B) signal to multiplexer 208, a write enable (WEN_B) signal and the CLK_B signal to clock gating circuit 222, and a 3-bit write address (WAD_B) signal to multiplexer 205.

Similarly, System_A 1 and System_B 2 each provide a plurality of read control signals to read control circuit 400. System A_1 provides a read enable (REN_A) signal and the CLK_A signal to clock gating circuit 223, and a 3-bit read address (RAD_A) signal to multiplexer 206. System_B 2 provides a read enable (REN_B) signal and the CLK_B signal to clock gating circuit 224, and a 3-bit read address (RAD_B) signal to multiplexer 206.

A data transfer from System_A 1 to System_B 2 will now be described. The controlling system transmits a request signal to direction control circuit 3. Thus, if System_A 1 is the controlling system, then System_A 1 transmits a write request signal to direction control circuit 3. Conversely, if System_B 2 is the controlling system, System_B 2 transmits a read request signal to direction control circuit 3. The controlled system then generates the appropriate acknowledge signal. After synchronizing and transmitting the acknowledge signal, direction control circuit 3 generates a logic low WSEL signal and a logic high RSEL signal for a data transfer from System_A 1 to System_B 2. System_A 1, which will write data values to dual-port memory 201, asserts a logic high WEN_A signal and a logic low REN_A signal. System_B 2, which will read data values from dual-port memory 201, asserts a logic high REN_B signal and a logic low WEN_B signal.

First, the operation of write control circuit 300 will be described. The logic low WSEL signal causes multiplexer 208 to pass the WDATA_A signals provided by System_A 1 to write data register 202. The logic high WEN_A signal provided by System_A 1 enables clock gating circuit 221 to pass the CLK_A signal to multiplexer 204. The logic low WEN_B signal prevents the CLK_B signal from passing through clock gating circuit 222. The logic low WSEL signal causes multiplexer 204 to pass the CLK_A signal from clock gating circuit 221 to write data register 202. The CLK_A signal clocks the WDATA_A signals provided by multiplexer 208 into write data register 202. The CLK_A signal is also provided to write pulse generator 213. Write pulse generator 213 generates write pulses which cause the WDATA_A signals stored in write data register 202 to be written to dual-port memory 201.

The logic low WSEL signal also causes multiplexer 205 to pass the 3-bit WAD_A signals to write address register 209. Write address register 209 is coupled to the output terminal of multiplexer 204, and thereby receives the CLK_A signal. The WAD_A signals are clocked into write address register 209 in synchronism with the CLK_A signal. The contents of write address register are provided to write address decoder 211. Write address decoder 211 is a 3-to- 8 decoder which asserts one of the eight word lines within dual-port memory 201 in response to the 13-bit WAD_A signal stored in write address register 209.

To summarize, the WDATA_A signals provided by System_A 1 are written to addresses within dual-port memory 201 defined by the WAD_A signals provided by System_A 1, in response to the CLK_A signal of System_A 1. System_A 1 therefore controls the write port of dual-port memory 201. The write port of dual-port memory 201 includes the terminals of memory 201 which are connected to write data register 202, write pulse generator 213 and write address decoder 211.

Now, the operation of read control circuit 400 will be described. The logic high REN_B signal provided by System_B 2 enables clock gating circuit 224 to pass the CLK_B signal to multiplexer 207. The logic low REN_A signal provided by System_A 1 prevents the CLK_A signal from passing through clock gating circuit 223. The logic high RSEL signal causes multiplexer 207 to pass the CLK_B signal from clock gating circuit 224 to read address register 210. The logic high RSEL signal also causes multiplexer 206 to pass the 3-bit RAD_B signals to read address register 210. The RAD_B signals are clocked into read address register 210 in synchronism with the CLK_B signal. The contents of read address register 210 are provided to read address decoder 212. Read address decoder 212 is a 3 -to- 8 decoder which asserts one of the eight word lines within dual-port memory 201 in response to the 3-bit RAD_B signal stored in read address register 210.

Multiplexer 207 is also connected to provide the CLK_B signal to read pulse generator 214. Read pulse generator 214 generates read pulses which cause the WDATA_A signals previously written to the address identified by the RAD_B signals to be read from dual-port memory 201 and provided to read register 203 as read data (RDATA) signals. The CLK_B signal is also provided to read data register 203. The CLK_B signal clocks the read data (RDATA) signals from dual-port memory 201 into read data register 203. System_B 2 then reads the RDATA signals from read register 203. Note that both System_A 1 and System_B 2 are coupled to read data register 203. Only the system which is scheduled to receive data reads the RDATA signals from read register 203.

To summarize, data values are read from addresses within dual-port memory 201 defined by the RAD_B signals provided by System_B 2, in response to the CLK_B signal of System_B 2. System_B 2 therefore controls the read port of dual-port memory 201. The read port of dual-port memory 201 includes the terminals of memory 201 which are connected to read data register 203, read pulse generator 214 and read address decoder 212.

A data transfer from System_B 2 to System_A 1 is accomplished in a similar manner as the previously described data transfer from System_A 1 to System_B 2. Again, the controlling system transmits a request signal to direction control circuit 3. If System_A 1 is the controlling system, then System_A 1 transmits a read request signal to direction control circuit 3. If System_B 2 is the controlling system, then System_B 2 transmits a write request signal to direction control circuit 3. The controlled system transmits the appropriate acknowledge signal to direction control circuit 3. After synchronizing and transmitting the acknowledge signal, direction control circuit 3 generates a logic high WSEL signal and a logic low RSEL signal for a data transfer from System_B 2 to System_A 1. System_B 2, which performs write operations to dual-port memory 201, asserts a logic high WEN_B signal and a logic low REN_B signal. System_A 1, which performs read operations from dual-port memory 201, asserts a logic high REN_A signal and a logic low WEN_A signal.

Within write control circuit 300, the logic high WSEL signal causes multiplexer 208 to pass the WDATA_B signals from System_B 2 to write data register 202. The logic high WSEL signal also causes multiplexer 205 to pass the WAD_B signal to write address register 209. The logic high WSEL signal, in combination with the logic high WEN_B signal, further causes multiplexer 204 to pass the CLK_B signal, such that the CLK_B signal is provided to write data register 202, write control register 209, and write pulse generator 213. In this manner, System_B 2 is given control of the write port of dual-port memory 201.

Within read control circuit 400, the logic low RSEL signal causes multiplexer 206 to pass the RAD_A signal to read address register 210. The logic low RSEL signal, in combination with the logic high REN_A signal, further causes multiplexer 207 to pass the CLK_A signal to read data register 203, read control register 210, and read pulse generator 214. In this manner, System_A 1 is given control of the read port of dual-port memory 201.

When the direction of data transfer is switched (i.e., when the WSEL and RSEL signals change states), System_A 1 temporarily generates logic low WEN_A and REN_A signals, and System_B 2 temporarily generates logic low WEN_B and REN_B signals, thereby preventing clock gating circuits 221–224 from passing the CLK_A and CLK_B signals. After the WSEL and RSEL signals have had sufficient time to settle, System_A 1 and System_B 2 assert the WEN_A, REN_A, WEN_B and REN_B as previously described. By operating in this manner, glitches are avoided when the direction of data transfer is switched.

Read operations are not allowed to occur when memory 201 is "empty" and write operations are not allowed to occur when memory 201 is "full. These memory control operations are performed by control logic located within System_A 1 and System_B 2. Information as to the number of read or write operations performed is transferred between System_A 1 and System_B 2 using synchronizer circuits (not shown).

For example, when data is being transferred from System_A 1 to System_B 2, the WEN_A signal is provided to System_B 2 through a synchronizer circuit which synchronizes the WEN_A signal with the CLK_B signal. Similarly, the REN_B signal is provided to System_A 1 through another synchronizer circuit which synchronizes the REN_B signal with the CLK_A signal. Thus, each of System_A 1 and System_B 2 is aware of the number of read and write operations performed within memory 201. Thus, by keeping track of the WEN_A signal and the synchronized REN_B signal, System_A 1 is able to determine when memory 201 is full, and will stop performing write operations while this condition exists. Similarly, by keeping track of the REN_B signal and the synchronized WEN_A signal, System_B 2 is able to determine when memory 201 is empty, and will stop performing read operations while this condition exists.

When data is being transferred in the opposite direction from System_B 2 to System_A 1, the REN_A signal is provided to System_B 2 through a synchronizer circuit which synchronizes the REN_A signal with the CLK_B signal. Similarly, the WEN_B signal is provided to System_A 1 through another synchronizer circuit which synchronizes the WEN_B signal with the CLK_A signal. In the manner described above, System A_1 and System_B 2 use the REN_A and WEN_B signals to determine if memory 201 is empty or full.

Direction control circuit 3, dual-port memory 201, write control circuit 300 and read control circuit 400 thereby facilitate bi-directional data transfer between System_A 1 and System_B 2. Because only one dual-port memory is required, silicon area is saved when compared with prior art alternatives.

In addition, when there is no data transfer between System_A 1 and System_B 2, clock gating circuits 221–224 are disabled, thereby preventing the CLK_A and CLK_B signals from being provided to write control circuit 300, read control circuit 400 and dual-port memory 201. This results in power savings when a data transfer is not taking place.

System_A 1 and System_B 2 can be, for example, separate electronic systems which co-exist in a larger computer system. In a particular embodiment, System_A 1 is a system located on an integrated circuit which includes a central processing unit (CPU) of the computer system. For example, System_A 1 can be an Ultrasparc 1 integrated circuit which is available from Sun Microsystems, Inc. System_B 2 can be a system located on the same or another integrated circuit which operates in an asynchronous clock domain. System_B 2 can be, for example, a conventional PCI-based system. Direction control circuit 3, dual-port memory 201, write control circuit 300 and read control circuit 400 can be integrated on the same chip as System_A 1. As a result, System_A 1 would be advantageously be capable of engaging in bi-directional data transfer with various PCI-based systems.

Although the invention has been described in connection with several embodiments, it is understood that this invention is not limited to the embodiments disclosed, but is capable of various modifications which would be apparent to one of ordinary skill in the art. Thus, the invention is limited only by the following claims.

What is claimed is:

1. An electronic system comprising:
a first system which operates in response to a first clock signal;
a second system which operates in response to a second clock signal, the first clock signal being asynchronous with respect to the second clock signal;
a direction control circuit connected between the first and second systems, the direction control circuit determining whether data transfer between the first and second systems is to occur in a first direction from the first system to the second system or in a second direction from the second system to the first system, the direction control circuit providing one or more direction control signals representative of the direction of data transfer;
a dual-port memory having a write port and a read port;
a write control circuit coupled to the first system, the second system and the direction control circuit, wherein the write control circuit couples the first system to the write port of the dual-port memory when the direction control signals are representative of the first direction of data transfer, and wherein the write control circuit couples the second system to the write port of the dual-port memory when the direction control signals are representative of the second direction of data transfer; and a read control circuit coupled to the first system, the second system and the direction control circuit, wherein the read control circuit couples the second system to the read port of the dual-port memory when the direction control signals are representative of the first direction of data transfer, and wherein the read control circuit couples the first system to the read port of the dual-port memory when the direction control signals are representative of the second direction of data transfer.

2. The electronic system of claim 1, wherein the first system, the direction control circuit, the dual-port memory, the write control circuit and the read control circuit are fabricated on the same integrated circuit.

3. The electronic system of claim 2, wherein the first system comprises a central processing unit.

4. The electronic system of claim 3, wherein the second system is a PCI compatible system.

5. A method of providing bi-directional data transfer between a first system which operates in response to a first clock signal and a second system which operates in response to a second clock signal, the first clock signal being asynchronous with respect to the second clock signal, the method comprising:

transmitting a request signal from the first system to a direction control circuit to initiate data transfer, the request signal controlling a direction of data transfer between the first and second systems, the direction of data transfer being either a first direction from the first system to the second system, or a second direction from the second system to the first system;

transmitting the request signal to the second system;

generating one or more direction control signals representative of the direction of data transfer;

coupling the first system to a write port of a dual-port memory when the direction control signals are representative of the first direction of data transfer;

coupling the second system to a read port of the dual-port memory when the direction control signals are representative of the first direction of data transfer;

coupling the second system to the write port of the dual-port memory when the direction control signals are representative of the second direction of data transfer; and coupling the first system to the read port of the dual-port memory when the direction control signals are representative of the second direction of data transfer.

6. The method of claim 5, wherein transmitting the request signal to the direction control circuit comprises:

transmitting a write request signal from the first system to the direction control circuit to initiate data transfer in the first direction; and transmitting a read request signal from the first system to the direction control circuit to initiate data transfer in the second direction.

7. The method of claim 6, further comprising:

transmitting a read request signal from the second system to the direction control circuit to initiate data transfer in the first direction; and transmitting a write request signal from the second system to the direction control circuit to initiate data transfer in the second direction.

8. The method of claim 5, further comprising:

synchronizing the request signal with the second clock signal, for transmission to the second system;

transmitting an acknowledge signal from the second system to the direction control circuit; and synchronizing the acknowledge signal with the first clock signal, for transmission to the first system.

9. A method of providing bi-directional data transfer between a first system which operates in response to a first clock signal and a second system which operates in response to a second clock signal, the first clock signal being asynchronous with respect to the second clock signal, the method comprising:

transmitting a request signal from the first system to a direction control circuit to initiate data transfer, the request signal indicating a direction of data transfer between the first and second systems, the direction of data transfer being either a first direction from the first system to the second system, or a second direction from the second system to the first system;

synchronizing the request signal to the second clock signal;

transmitting an acknowledge signal from the second system to the direction control circuit; and synchronizing the acknowledge signal to the first clock signal;

generating one or more direction control signals representative of the direction of data transfer;

coupling the first system to a write port of a dual-port memory when the direction control signals are representative of the first direction of data transfer;

coupling the second system to a read port of the dual-port memory when the direction control signals are representative of the first direction of data transfer;

coupling the second system to the write port of the dual-port memory when the direction control signals are representative of the second direction of data transfer; and coupling the first system to the read port of the dual-port memory when the direction control signals are representative of the second direction of data transfer.

10. The method of claim 9, wherein transmitting the request signal to the direction control circuit comprises:

transmitting a write request signal from the first system to the direction control circuit to initiate data transfer in the first direction; and transmitting a read request signal from the first system to the direction control circuit to initiate data transfer in the second direction.

11. The method of claim 9, further comprising:

transmitting the request signal from the direction control circuit to the second system, after synchronizing the request signal;

transmitting the acknowledge signal from the direction control circuit to the first system, after synchronizing the acknowledge signal.

12. The method of claim 9, further comprising transmitting a second request signal from the second system to the direction control circuit to initiate data transfer, the second request signal indicating the direction of data transfer between the first and second systems.

* * * * *